(12) United States Patent
Joseph et al.

(10) Patent No.: US 11,036,905 B1
(45) Date of Patent: Jun. 15, 2021

(54) HIERARCHICAL POWER ANALYSIS USING IMPROVED ACTIVITY ABSTRACTION AND CAPACITANCE ABSTRACTION BY ACCOUNTING FOR DESIGN HETEROGENEITY EXTREMITIES

(71) Applicant: International Business Machines Corporation, Armonk, NY (US)

(72) Inventors: Arun Joseph, Bangalore (IN); Spandana V. Rachamalla, Bangalore (IN); Rahul Rao, Bangalore (IN); Shashidhar Reddy, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/734,669

(22) Filed: Jan. 6, 2020

(51) Int. Cl.
| | | |
|---|---|---|
| G06F 115/10 | (2020.01) | |
| G06F 119/06 | (2020.01) | |
| G06F 30/327 | (2020.01) | |
| G06F 30/3323 | (2020.01) | |
| G06F 30/3308 | (2020.01) | |

(52) U.S. Cl.
CPC ........ G06F 30/327 (2020.01); G06F 30/3308 (2020.01); G06F 30/3323 (2020.01); *G06F 2115/10* (2020.01); *G06F 2119/06* (2020.01)

(58) Field of Classification Search
CPC .............. G06F 30/327; G06F 30/3323; G06F 30/3308; G06F 2115/10; G06F 2119/06; G06F 30/398; G06F 2111/04; G06F 2119/18; G06F 2111/20; G06F 119/18; G06F 111/20
See application file for complete search history.

(56) References Cited

U.S. PATENT DOCUMENTS

| | | |
|---|---|---|
| 9,424,381 B2 | 8/2016 | Dhanwada et al. |
| 9,697,306 B1 | 7/2017 | Haridass et al. |
| 2011/0218779 A1* | 9/2011 | Palisetti .................. G06F 17/10 703/2 |

(Continued)

OTHER PUBLICATIONS

Jacobson et al., *Empirically derived abstractions in uncore power modeling for a server-class processor chip*, Proceedings of the 2014 international symposium on Low power electronics and design (ISLPED'14), Aug. 2014, pp. 147-152, ACM New York, NY, USA.

(Continued)

*Primary Examiner* — Vuthe Siek
(74) *Attorney, Agent, or Firm* — Teddi Maranzano

(57) ABSTRACT

Method, apparatus and computer program product for hierarchical power analysis using improved activity abstraction and capacitance abstraction by accounting for design heterogeneity extremities comprising extracting design heterogeneity extremities from an RTL design; accounting for the design heterogeneity extremities during macro clock and data signals activity abstraction to generate improved macro activity abstractions; accounting for the design heterogeneity extremities during macro clock and data switching capacitance abstraction to generate improved macro capacitance abstractions; and using improved macro activity abstractions and improved macro capacitance abstractions during hierarchical chip power analysis.

20 Claims, 2 Drawing Sheets

(56) References Cited

U.S. PATENT DOCUMENTS

| | | | |
|---|---|---|---|
| 2013/0110423 A1* | 5/2013 | Zimmermann | G06F 3/0625 |
| | | | 702/61 |
| 2014/0149957 A1* | 5/2014 | Alpert | G06F 30/392 |
| | | | 716/122 |
| 2015/0058653 A1 | 2/2015 | Blayvas | |
| 2016/0070321 A1 | 3/2016 | Shapira et al. | |
| 2017/0004234 A1 | 1/2017 | Dhanwada et al. | |
| 2017/0147727 A1 | 5/2017 | Bickford et al. | |
| 2017/0162559 A1* | 6/2017 | Lesenco | H01L 29/0676 |
| 2017/0300604 A1 | 10/2017 | Shehata et al. | |

OTHER PUBLICATIONS

Dhanwada et al., *Efficient PVT independent abstraction of large IP blocks for hierarchical power analysis*, In Proceedings International Conference on Computer-Aided Design (ICCAD), Nov. 2013, pp. 458-465, IEEE Press, Piscataway, NJ, USA.

Joseph et al, *Efficient Techniques for Per Clock Gating Domain Contributor based Power Abstraction of IP Blocks for Hierarchical Power Analysis*, PowerPoint, slideshare.net (online), accessed Oct. 29, 2019, 10 pages, URL: www.slideshare.net/ArunJoseph27/per-domain-power-analysis.

Nalla et al., *A Formal Method to Uncover Sequential Redundancy in an Industrial Context*, 29th International Conference on VLSI Design (VLSID'16), Jan. 2016, IEEE Computer Society Washington, DC, USA.

Joseph et al., *FVCAG: A framework for formal verification driven power modeling and verification*, Proceedings of the 2016 International Symposium on Low Power Electronics and Design (ISLPED'16), Aug. 2016, pp. 260-265, ACM New York, NY, USA.

* cited by examiner

ХIERARCHICAL POWER ANALYSIS USING IMPROVED ACTIVITY ABSTRACTION AND CAPACITANCE ABSTRACTION BY ACCOUNTING FOR DESIGN HETEROGENEITY EXTREMITIES

BACKGROUND

Field of the Invention

The field of the present disclosure is chip power analysis, or, more specifically, methods, apparatus, and products for hierarchical power analysis using improved activity abstraction and capacitance abstraction by accounting for design heterogeneity extremities.

Description of Related Art

Modern fin field-effect transistor (FinFET-based) microprocessors' dynamic power consumes a lot of chip power under high utilization conditions. Power consumption is important in design because it affects cost and reliability. Microprocessors cater to a broad range of workloads, and each workload has a unique power signature. In addition to heterogeneity across workloads, there is notable heterogeneity in power profile across the chip, even within IP blocks. Microprocessor designs are power aware in order to control power consumption.

One of the difficulties in designing modern microprocessors is swift, accurate power modeling. Particularly as devices increase in complexity, e.g., by including design sub-blocks with multiple time domains, the design approaches for those devices use abstractions to address that additional complexity. Therefore, efficient abstractions that enable rapid and accurate power analysis are desired.

SUMMARY

Methods, systems, and apparatus for hierarchical power analysis using improved activity abstraction and capacitance abstraction by accounting for design heterogeneity extremities are disclosed in this specification. Methods, systems, and apparatus for hierarchical power analysis using improved activity abstraction and capacitance abstraction by accounting for design heterogeneity extremities include extracting design heterogeneity extremities from an RTL design; accounting for the design heterogeneity extremities during macro clock and data signals activity abstraction to generate improved macro activity abstractions; accounting for the design heterogeneity extremities during macro clock and data switching capacitance abstraction to generate improved macro capacitance abstractions; and using improved macro activity abstractions and improved macro capacitance abstractions during hierarchical chip power analysis.

The foregoing and other objects, features and advantages of the disclosure will be apparent from the following more particular descriptions of exemplary embodiments of the present disclosure as illustrated in the accompanying drawings wherein like reference numbers generally represent like parts of exemplary embodiments of the present disclosure.

DETAILED DESCRIPTION

Figure 1:
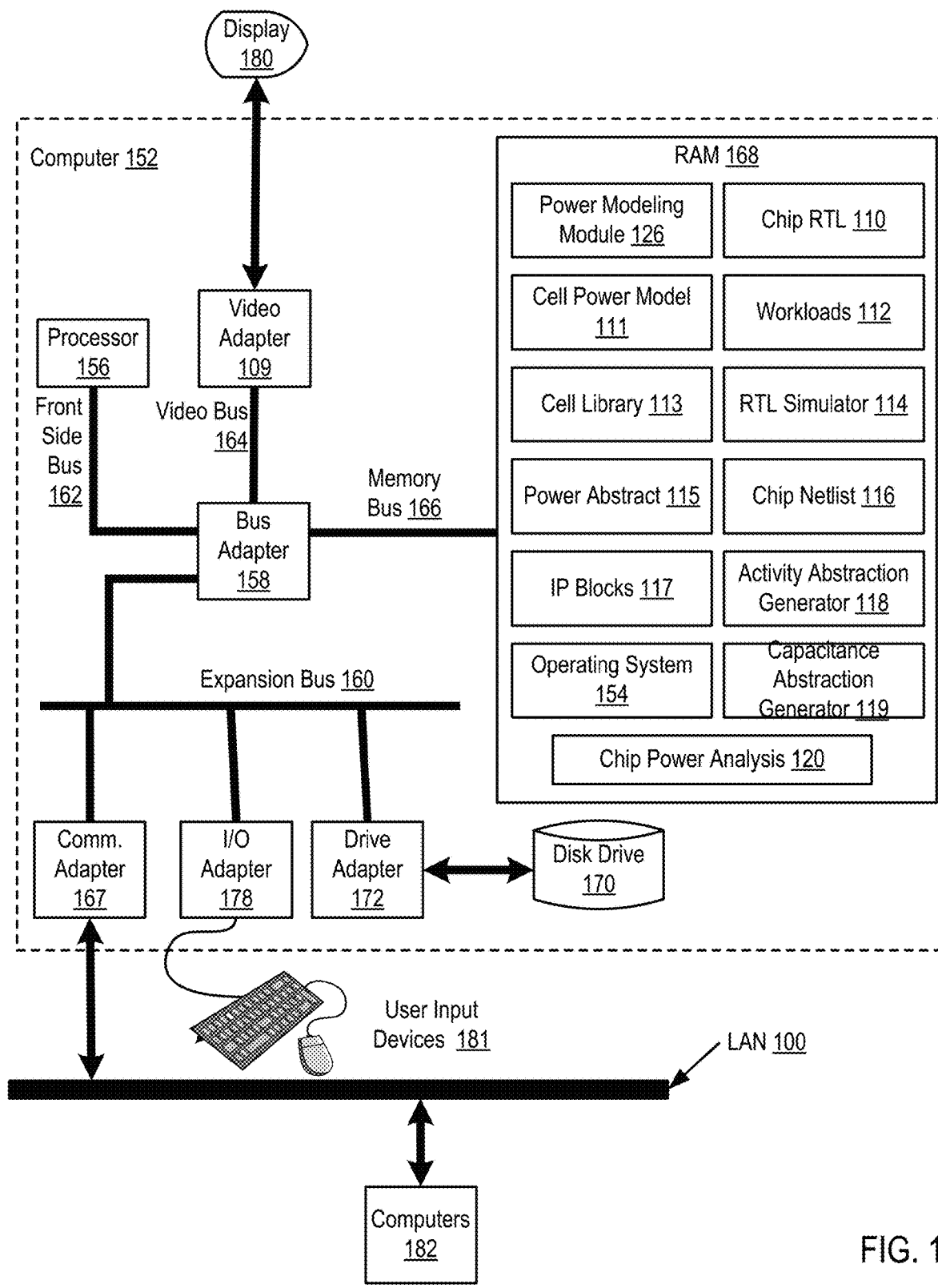
FIG. 1 sets a block diagram of automated computing machinery including an example computer useful in hierarchical power analysis using improved activity abstraction and capacitance abstraction by accounting for design heterogeneity extremities according to embodiments of the present disclosure.

Exemplary methods, apparatus, and products for hierarchical power analysis using improved activity abstraction and capacitance abstraction by accounting for design heterogeneity extremities in accordance with the present disclosure are described with reference to the accompanying drawings, beginning with FIG. 1. FIG. 1 sets forth a block diagram of automated computing machinery comprising an exemplary computing system (152) or host processor configured for hierarchical power analysis using improved activity abstraction and capacitance abstraction by accounting for design heterogeneity extremities according to embodiments of the present disclosure. The computing system (152) of FIG. 1 includes at least one computer processor (156) or "CPU" as well as random access memory (168) ("RAM") which is connected through a high speed memory bus (166) and bus adapter (158) to processor (156) and to other components of the computing system (152).

Stored in RAM (168) is a power modeling module (126), a module of computer program instructions for hierarchical power analysis using improved activity abstraction and capacitance abstraction by accounting for design heterogeneity extremities. The module (126) may generate improved activity abstraction and capacitance abstraction by accounting for design heterogeneity extremities during hierarchical power analysis by extracting design heterogeneity extremities from an RTL design; accounting for the design heterogeneity extremities during macro clock and data signals activity abstraction to generate improved macro activity abstractions; accounting for the design heterogeneity extremities during macro clock and data switching capacitance abstraction to generate improved macro capacitance abstractions; and using improved macro activity abstractions and improved macro capacitance abstractions during hierarchical chip power analysis.

Also stored in RAM (168) are various data elements and/or data structures operable to allow module (126) to hierarchical power analysis using improved activity abstraction and capacitance abstraction by accounting for design heterogeneity extremities. As described in more detail below with reference to FIG. 2, example data elements may include: chip RTL (110), cell power model (111), workloads (112), cell library (113), RTL simulator (114), power abstract (115), chip netlist (116), IP blocks (117), activity abstraction generator (118), capacitance abstraction generator (119), and/or chip power analysis (120). Each of these elements is described in more detail below with reference to FIG. 2.

Also stored in RAM (168) is an operating system (154). Operating systems useful in computers configured for detecting spurs in a sampled waveform in a mixed analog/digital system using the phase of the frequency response according to embodiments of the present disclosure include UNIX™, Linux™, Microsoft Windows™, AIX™, IBM's iOS™, and others as will occur to those of skill in the art. The operating system (154) in the example of FIG. 1 is shown in RAM (168), but many components of such software typically are stored in non-volatile memory also, such as, for example, on a disk drive (170).

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for detecting spurs in a sampled waveform in a mixed analog/digital system using the phase of the frequency response according to embodiments of the present disclosure include Integrated Drive Electronics ("IDE") adapters, Small Computer System Interface ("SCSI") adapters, and others as will occur to those of skill in the art. Non-volatile computer memory also may be implemented for as an optical disk drive, electrically erasable programmable read-only memory (so-called "EEPROM" or "Flash" memory), RAM drives, and so on, as will occur to those of skill in the art.

The example computing system (152) of FIG. 1 includes one or more input/output ("I/O") adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (109), which is an example of an I/O adapter specially designed for graphic output to a display device (180) such as a display screen or computer monitor. Video adapter (109) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be a Local Area Network (LAN) (100) carried out serially through RS-232 connections, through external buses such as a Universal Serial Bus ("USB"), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for hierarchical power analysis using improved activity abstraction and capacitance abstraction by accounting for design heterogeneity extremities according to embodiments of the present disclosure include modems for wired dial-up communications, Ethernet (IEEE 802.3) adapters for wired data communications, and 802.11 adapters for wireless data communications.

In existing power modelling methodology, a contributor based cell power model (111) is generated using the cell library (113). A typical cell library (113) includes hundreds of cells, each having multiple states and transistors. Cell library characterization usually generates power data for several process corners. The cell power model (111) is then used in generating the power abstract (115) at the IP block level (117).

The power abstract (115) is a parameterized model of power consumption for a particular block of a larger system model. A block (117) may also be referred to as a macro or an IP block. The power abstract (114) relies for its parameterization on the modeling of power contributors, or components of a block that contribute to the overall power consumption of a block. Parameterization is the modeling of a component or block through the use of parameters. For example, a component or block may be parameterized by identifying or calculating one or more values associated with an event such as a change in operating conditions. These events may be chosen to identify a plurality of operating conditions under which the component or block may operate. For example, as described in more detail below, a component or block may be parameterized according to a plurality of power events, with each event corresponding to different power conditions. The parameter value may be, for example, an effective capacitance under the particular power condition. Power consumed includes each component power modeled and abstracted, including both an activity abstract and an effective capacitance abstract, and all activity abstracts and effective capacitance abstracts for all components or domains are added up to the total dynamic power.

Additionally, the chip hardware is described in a register-transfer level (RTL) design (110) that uses a hardware description language to create high-level representations of a circuit, which can be simulated with various workloads (112). The RTL simulator (114) can run the RTL (110) and various workloads (112) with iterative clock and data switching.

The IP power abstracts (115) are used with information from the chip netlist (116) and the clock and switching data from the RTL simulation (114) with various workloads (112), each generating a unique power signature, to analyze power at the chip level (120).

However, while IP power abstraction may allow for more accurate capturing of highly nonlinear and variable power consumption, there are heterogeneity extremities that pose notable errors during abstractions. Some heterogeneity extremities may include completely gated rather than free running domains or latches, redundant latches, constant 0s or constant 1 latches, error or parity error latches, and held signals at 0 or 1. These heterogeneity extremities cause significant power spikes, both high and low, in power consumption that pose difficulty during power abstraction and can reduce power accuracy.

Figure 2:
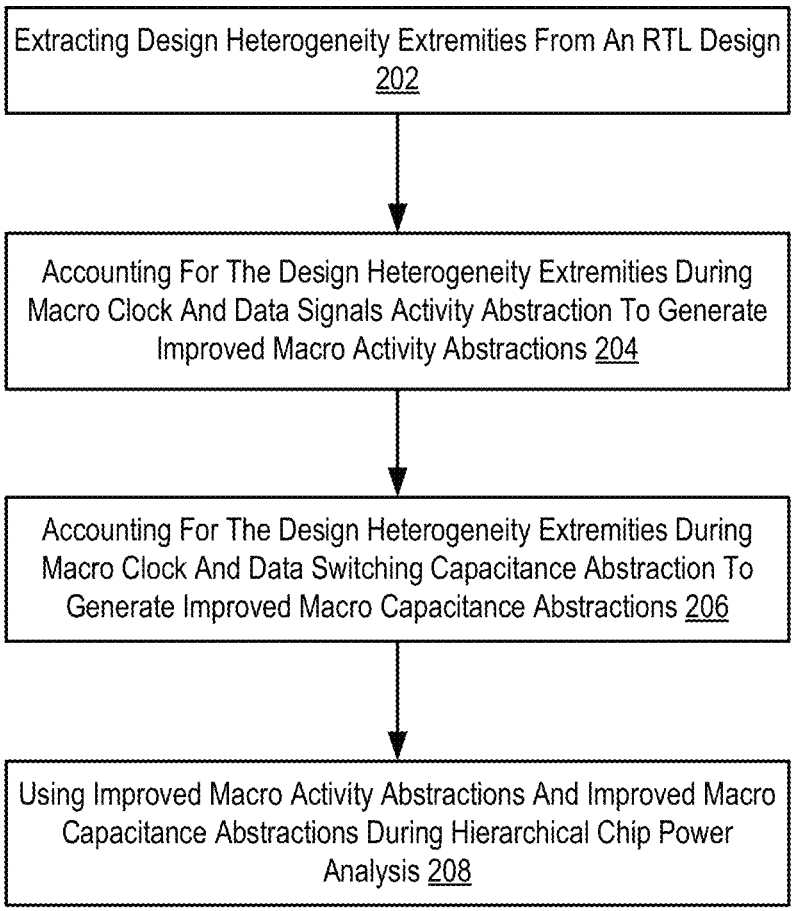
FIG. 2 sets forth a flow chart illustrating an exemplary method for hierarchical power analysis using improved activity abstraction and capacitance abstraction by accounting for design heterogeneity extremities according to embodiments of the present disclosure.

For further explanation, FIG. 2 sets forth a flow chart illustrating an exemplary method for hierarchical power analysis using improved activity abstraction and capacitance abstraction by accounting for design heterogeneity extremities according to embodiments of the present disclosure. The method of FIG. 2 includes extracting (202) design heterogeneity extremities from an RTL design (110). Extracting (202) design heterogeneity extremities from an RTL design (110) could be by formal techniques. A program may examine the RTL language (110) and automatically extract some heterogeneity extremities including completely gated rather than free running domains or latches, redundant latches, constant 0s or constant 1 latches, error or parity error latches, held signals at 0 or 1. The program may use key word searches or search for phrases or use other methods to search for heterogeneity extremities in the RTL language (110). The extraction may be automated. The design heterogeneity extremities may be labelled or marked or bucketed in the RTL (110).

FIG. 2 also includes accounting (204) for the design heterogeneity extremities during macro clock and data signals activity abstraction to generate improved macro activity abstractions.

An activity abstraction generation tool or processor (118) obtains the power contributor models (111) and generates an activity abstraction. The activity abstraction uses logic simulation and case iterations during macro clock gating and data activity including latch output switch rates to generate activity abstracts.

In step (204), the activity abstraction accounts for the heterogeneity extremities that were extracted and bucketed in step (202). When generating the improved activity abstract, the cells or domains with heterogeneity extremities are handled separately, either as an additional factor or weight in the generated activity abstract or as a separate additional activity abstract.

FIG. 2 also includes accounting (206) for the design heterogeneity extremities during macro clock and data switching capacitance abstraction to generate improved macro capacitance abstractions.

An effective capacitance abstraction generation tool or processor (119) obtains the power contributor models (111) and generates a capacitance abstraction. The capacitance abstraction uses the netlist information (116) and case iterations macro gatable clock capacitance abstraction and latch output data switching capacitance abstraction to generate capacitance abstracts. Since the power contributor model of the present invention is an abstraction of the cell whose power is being modeled, the effective capacitance will typically encapsulate the effects of many physical capacitances and power dissipation due to short circuit currents. These physical capacitances typically will not switch at the same rate as the reference pin, and hence the effective capacitance may or may not be equal to the sum of the physical capacitances whose power impact is modeled by the effective capacitance.

In step (206), the capacitance abstraction accounts for the heterogeneity extremities that were extracted and bucketed in step (202). When generating the improved capacitance abstract, the cells or domains with heterogeneity extremities are handled separately, either as an additional factor or weight in the generated capacitance abstract or as a separate additional capacitance abstract.

FIG. 2 also includes using (208) improved macro activity abstractions and improved macro capacitance abstractions during hierarchical chip power analysis (120).

During the hierarchical chip power analysis (120), the improved macro activity abstractions and improved macro capacitance abstractions are used for each component and domain with the various workloads (112) to determine the total dynamic power. The total dynamic power is more accurate due to the inclusion of improved activity abstractions and capacitance abstractions that account for heterogeneity extremities.

In view of the explanations set forth above, readers will recognize that the benefits of hierarchical power analysis using improved activity abstraction and capacitance abstraction by accounting for design heterogeneity extremities according to embodiments of the present disclosure include:
  Improved dynamic power accuracy.
  Better breakdown and takedown of power consumed by design inefficiencies.

Exemplary embodiments of the present disclosure are described largely in the context of a fully functional computer system detecting spurs in a sampled waveform in a mixed analog/digital system using the phase of the frequency response. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider). In some embodiments, electronic circuitry including, for example, programmable logic circuitry, field-programmable gate arrays ("FPGA"), or programmable logic arrays ("PLA") may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by program instructions on a computing device,
extracting design heterogeneity extremities from a register-transfer level (RTL) design;
accounting for the design heterogeneity extremities during macro clock and data signals activity abstraction to generate improved macro activity abstractions, wherein the design heterogeneity extremities are handled separately to generate an additional macro activity abstraction;
accounting for the design heterogeneity extremities during macro clock and data switching capacitance abstraction to generate improved macro capacitance abstractions; and
using improved macro activity abstractions and improved macro capacitance abstractions during hierarchical chip power analysis.

2. The method of claim 1, wherein extracting design heterogeneity extremities from an RTL design includes extracting design heterogeneity extremities from an RTL design that produce both high and low power spikes.

3. The method of claim 1, wherein the design heterogeneity extremities are selected from a group consisting of completely gated and free running domains or latches, redundant latches, constant 0s or constant 1 latches, error or parity error latches, and held signals at 0 or 1.

4. The method of claim 1, wherein the design heterogeneity extremities are extracted from the RTL design using automated formal techniques.

5. The method of claim 1, wherein the improved macro activity abstractions and improved macro capacitance abstractions used during hierarchical chip power analysis are workload independent.

6. The method of claim 1, wherein the improved macro activity abstractions and improved macro capacitance abstractions used during hierarchical chip power analysis are used in designing a FinFET chip.

7. The method of claim 5, wherein the improved macro activity abstractions and improved macro capacitance abstractions used during hierarchical chip power analysis are used in designing a microprocessor chip.

8. An apparatus comprising a computing device, a computer processor, and a computer memory operatively coupled to the computer processor, the computer memory storing computer program instructions that are configured to, when executed by the computer processor, cause the apparatus to perform operations comprising:
extracting design heterogeneity extremities from a register-transfer level (RTL) design;
accounting for the design heterogeneity extremities during macro clock and data signals activity abstraction to generate improved macro activity abstractions, wherein the design heterogeneity extremities are handled separately to generate an additional macro activity abstraction;
accounting for the design heterogeneity extremities during macro clock and data switching capacitance abstraction to generate improved macro capacitance abstractions; and
using improved macro activity abstractions and improved macro capacitance abstractions during hierarchical chip power analysis.

9. The apparatus of claim 8, wherein the design heterogeneity extremities produce both high and low power spikes.

10. The apparatus of claim 8, wherein the design heterogeneity extremities are selected from a group consisting of completely gated and free running domains or latches, redundant latches, constant 0s or constant 1 latches, error or parity error latches, and held signals at 0 or 1.

11. The apparatus of claim 8, wherein the design heterogeneity extremities are extracted from the RTL design using automated formal techniques.

12. The apparatus of claim 8, wherein the improved macro activity abstractions and improved macro capacitance abstractions used during hierarchical chip power analysis are workload independent.

13. The apparatus of claim 8, wherein the improved macro activity abstractions and improved macro capacitance abstractions used during hierarchical chip power analysis are used in designing a FinFET chip.

14. The apparatus of claim 8, wherein the improved macro activity abstractions and improved macro capacitance abstractions used during hierarchical chip power analysis are used in designing a microprocessor chip.

15. A computer program product comprising a non-transitory computer readable storage medium and computer program instructions stored therein that are configured to, when executed by a processor, cause a computer to perform operations comprising:

extracting design heterogeneity extremities from a register-transfer level (RTL) design;
accounting for the design heterogeneity extremities during macro clock and data signals activity abstraction to generate improved macro activity abstractions, wherein the design heterogeneity extremities are handled separately to generate an additional macro activity abstraction;
accounting for the design heterogeneity extremities during macro clock and data switching capacitance abstraction to generate improved macro capacitance abstractions; and
using improved macro activity abstractions and improved macro capacitance abstractions during hierarchical chip power analysis.

16. The computer program product of claim 15, wherein the design heterogeneity extremities produce both high and low power spikes.

17. The computer program product of claim 15, wherein the design heterogeneity extremities are selected from a group consisting of completely gated and free running domains or latches, redundant latches, constant 0s or constant 1 latches, error or parity error latches, and held signals at 0 or 1.

18. The computer program product of claim 15, wherein the design heterogeneity extremities are extracted from the RTL design using automated formal techniques.

19. The computer program product of claim 15, wherein the improved macro activity abstractions and improved macro capacitance abstractions used during hierarchical chip power analysis are workload independent.

20. The computer program product of claim 15, wherein the improved macro activity abstractions and improved macro capacitance abstractions used during hierarchical chip power analysis are used in designing a FinFET chip.

* * * * *